United States Patent
Gomer et al.

(10) Patent No.: US 11,486,762 B2
(45) Date of Patent: Nov. 1, 2022

(54) SYSTEMS AND METHODS FOR SPECTRAL PROCESSING IMPROVEMENTS IN SPATIAL HETERODYNE SPECTROSCOPY

(71) Applicant: CHEMIMAGE CORPORATION, Pittsburgh, PA (US)

(72) Inventors: Nathaniel Gomer, Sewickley, PA (US); Heather E. Gomer, Sewickley, PA (US)

(73) Assignee: CHEMIMAGE CORPORATION, Pittsburgh, PA (US)

(*) Notice: Subject to any disclaimer, the term of this patent is extended or adjusted under 35 U.S.C. 154(b) by 0 days.

(21) Appl. No.: 17/379,616

(22) Filed: Jul. 19, 2021

(65) Prior Publication Data
US 2022/0018714 A1 Jan. 20, 2022

Related U.S. Application Data (60) Provisional application No. 63/053,365, filed on Jul. 17, 2020.

(51) Int. Cl.
*G01J 3/44* (2006.01)
*G01J 3/28* (2006.01)

(52) U.S. Cl.
CPC .............. *G01J 3/44* (2013.01); *G01J 3/2803* (2013.01)

(58) Field of Classification Search
CPC .. G01J 3/44; G01J 3/2803; G01J 3/40; G01N 21/65
See application file for complete search history.

(56) References Cited

U.S. PATENT DOCUMENTS

| | | |
|---|---|---|
| 2004/0207855 A1 | 10/2004 | Brady et al. |
| 2013/0188181 A1 | 7/2013 | Angel et al. |
| 2013/0222801 A1 | 8/2013 | Harel et al. |

FOREIGN PATENT DOCUMENTS

WO WO-2021207118 A1 * 10/2021

OTHER PUBLICATIONS

Egan, M.J., 2017. Spatial Heterodyne Raman Spectroscopy for Planetary Surface Exploration (Doctoral dissertation, University of Hawai'i at Mānoa). (Year: 2017).*

Welch, "The Use of Fast Fourier Transform for the Estimation of Power Spectra: A Method Based on Time Averaging Over Short, Modified Periodograms," IEEE Trans. Audio and Electroacoust., Jun. 1967, vol. AU-15, pp. 17-20.

* cited by examiner

*Primary Examiner* — Tarifur R Chowdhury
*Assistant Examiner* — Jonathon Cook
(74) *Attorney, Agent, or Firm* — DLA Piper (US) LLP (57) ABSTRACT

Raman spectroscopy data is collected using a Spatial Heterodyne Spectrometer and processed in order to reduce signal noise. The processing of the Raman spectroscopy data includes segmenting generating an interferogram from the Raman spectroscopy data, segmenting the interferogram, determining an estimate of power spectrum density, and averaging the estimates of power spectrum density for each segment to provide an output spectrum. The output spectrum has greatly reduced variance of the individual power measurements, and allows the length of segments to be optimized to balance noise reduction operations and the loss of frequency resolution.

8 Claims, 5 Drawing Sheets

SYSTEMS AND METHODS FOR SPECTRAL PROCESSING IMPROVEMENTS IN SPATIAL HETERODYNE SPECTROSCOPY

CROSS-REFERENCE TO RELATED APPLICATIONS

This application claim priority to U.S. Provisional Application No. 63/053,365 filed Jul. 17, 2020, which is incorporated by reference herein in its entirety.

TECHNICAL FIELD

The present disclosure relates generally to systems and methods for improving spatial heterodyne spectroscopy. In particular, the present disclosure relates to methods and systems that improve the signal-to-noise ratio for spatial heterodyne spectroscopy systems. More particularly, the present disclosure relates to methods and systems that improve the signal-to-noise ratio for fiber array spectral translator ("FAST") based spatial heterodyne spectroscopy systems.

BACKGROUND

Spatial heterodyne spectroscopy ("SHS") is an interference-based spectroscopic technique. SHS requires no moving parts. Rather, SHS is designed based on a Michelson interferometer where mirrors are replaced by diffraction gratings, and the detector is a Charge Coupled Device (CCD) array. By imaging the gratings, crossed wavefronts are superimposed on the detector, thereby forming interference fringes.

Figure 2:
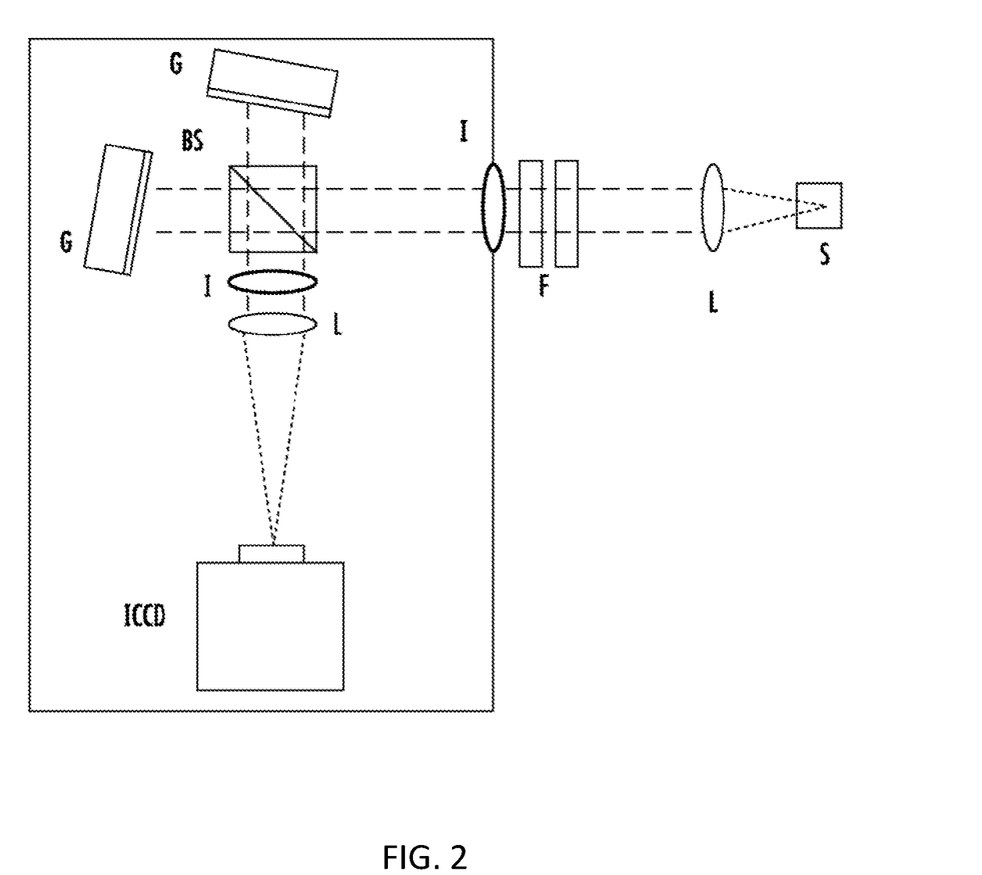
FIG. 2 depicts a schematic diagram of an illustrative SHS Raman spectrometer system layout.

FIG. 2 depicts a schematic diagram of an illustrative SHS Raman spectrometer system layout. As shown in FIG. 2, the illustrative SHS Raman spectrometer system includes lenses (L), gratings (G), a beam splitter (BS), laser rejection filters (F), apertures/irises (I), a sample holder (S), and an intensified charge-coupled device (ICCD).

Figure 3:
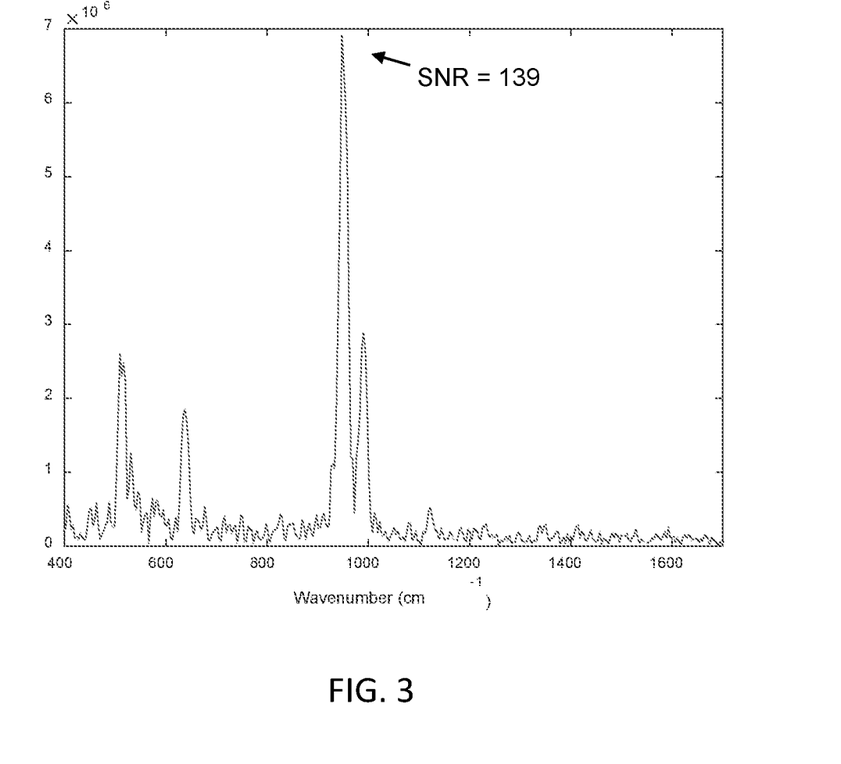
FIG. 3 depicts an illustrative Raman spectrum resulting from the application of a Fourier transform analysis on a sample using an SHS spectroscopy system.

FIG. 3 depicts an illustrative Raman spectrum resulting from the application of a Fourier transform analysis on a sample using an SHS spectroscopy system. As shown in FIG. 3, a conventional Fourier transform analysis of the illustrative sample material identifies power intensity peaks at four wavenumbers with a highest peak at 948 $cm^{-1}$. The highest peak has a signal-to-noise ratio of 139 based on the power signature of the non-peak wavenumbers (peak power of about $7 \times 10^6$ for peak and baseline power of about 1400). One of ordinary skill in the art will be aware that the Raman spectrum shown in FIG. 3 is merely an exemplary signature for a particular sample and is non-limiting with respect to the scope of this disclosure.

Welch's Method has been used to improve or modify the resolution of time series data. Using Welch's Method, a time series is divided into overlapping segments: the original data segment is split up into L data segments of length M, overlapping by D points. If $D=M/2$, the overlap is said to be 50%. If $D=0$, the overlap is said to be 0%.

The overlapping segments are then windowed. After the data is divided into overlapping segments, the individual L data segments have a window applied to them (in the time domain) to reduce the bias in the periodogram. Most window functions afford more influence to the data at the center of the set than to data at the edges, which represents a loss of information. To mitigate that loss, the individual data sets are commonly overlapped in time. The modified periodogram of each windowed segment is then calculated by computing the discrete Fourier transform of length N and the squared magnitude of the result. The individual periodograms are then averaged, which reduces the variance of the individual power measurements. The end result is an array of power measurements vs. frequency.

Conventional interferometric spectroscopy systems apply a standard Fourier transform to a detected spectral range in order to determine the wavelengths at which signals are received. However, this may result in an output that has significant baseline noise and limited peak intensity. Moreover, the resolution of such systems may be limited because information from every sensor in a sensor array is typically considered.

What is needed is a spectroscopy system that has an improved signal-to-noise ratio as compared to conventional systems.

A further need exists for a spectroscopy system that can achieve higher resolution than conventional systems.

SUMMARY

In one embodiment, there is a method of performing spectral processing using a spectroscopy system, the method comprising: collecting Raman spectral data using a spatial heterodyne spectrometer having a sensor array comprising a plurality of sensors; segmenting the sensor array into a plurality of segments, wherein each of the plurality of segments includes one or more of the plurality of sensors; for each segment, determining an estimate of power spectrum density; and averaging the estimates of power spectrum density for each segment to provide an output spectrum.

In another embodiment, each of the plurality of segments has the same number of sensors.

In another embodiment, each of the plurality of segments has between about 25% and about 75% of the plurality of sensors.

In another embodiment, each of the plurality of segments has about 35% of the plurality of sensors.

In another embodiment, an offset between a first segment and a second segment is less than a number of sensors in the first segment.

In another embodiment, wherein determining an estimate of power spectrum density comprises: determining a modified periodogram for each segment; and performing a finite Fourier transform for the modified periodogram. The method of claim 6, further comprising: applying a window to one or more sensors of the sensor array.

In another embodiment, the window is one or more of a Hamming window, a Parzen window, a Bartlett window, a Hann window, a rectangular window, a Blackman window, a Blackman-Harris window, a Kaiser-Bessel window, and a Tukey window.

DRAWINGS

The accompanying drawings, which are incorporated in and form a part of the specification, illustrate the embodiments of the invention and together with the written description serve to explain the principles, characteristics, and features of the invention. In the drawings.

DETAILED DESCRIPTION

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

The embodiments of the present teachings described below are not intended to be exhaustive or to limit the teachings to the precise forms disclosed in the following detailed description. Rather, the embodiments are chosen and described so that others skilled in the art may appreciate and understand the principles and practices of the present teachings.

Although the present disclosure is generally directed to systems and methods for spatial heterodyne Raman spectroscopy, the same or a similar system to the one described herein can be utilized for laser-induced breakdown spectroscopy (LIBS). Spatial heterodyne spectrometers (SHS) are compatible with pulsed laser excitation and offer several advantages over previously developed spectrometers including high spectral resolution in a very small form factor; a large acceptance angle; very high optical etendue and thus high throughput; and demonstrated high resolution in the UV range.

Raman is a vibrational spectroscopic technique where a laser or other monochromatic light source is used to excite a sample to be measured, and Raman photons are collected to generate the Raman spectrum, which is a plot of Raman scatter intensity versus energy relative to the laser energy or Raman shift in units of wavenumbers, $cm^{-1}$. Raman photons can be shifted to higher energy versus the laser photon energy (e.g., anti-Stokes scattering) or shifted to lower energy than the laser energy (e.g., Stokes scattering). A monochromator is typically used to disperse the Raman scattered light before it is collected by a detector, usually a CCD. In Fourier Transform Raman spectroscopy, a Michelson interferometer is used rather than a monochromator. A Michelson interferometer is a moving mirror interferometer. Stationary, tilted-mirror interferometers have also been used for Raman spectroscopy.

Figure 1A:
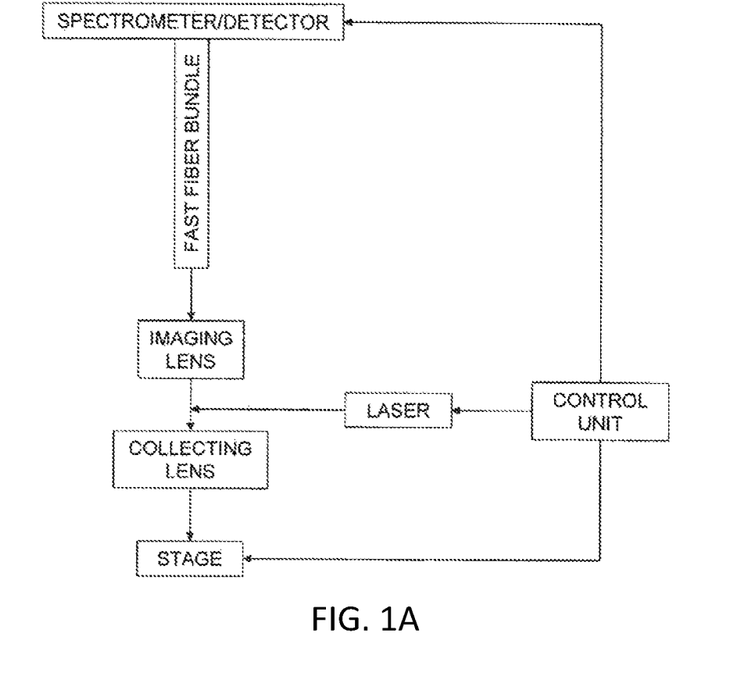
FIG. 1A depicts a block diagram of an illustrative "FAST" based spectroscopy system.
Figure 1B:
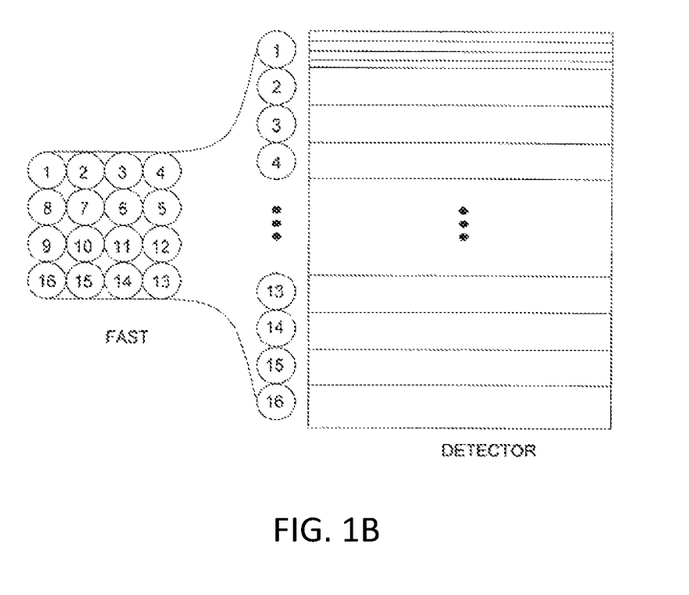
FIG. 1B depicts a schematic drawing of an illustrative FAST fiber layout showing an exemplary spatial mapping arrangement.

A FAST system, such as the system shown in FIGS. 1A-1B, when used in conjunction with a photon detector allows massively parallel acquisition of full spectral images. A FAST system can provide rapid real-time analysis for quick detection, classification, identification, and visualization of a sample. The FAST technology can acquire a few to thousands of full spectral range, spatially resolved spectra simultaneously. A FAST array contains multiple optical fibers that may be arranged in a two-dimensional array on one end and a one-dimensional (i.e., linear) array on the other end, such as is shown in FIG. 3B. The linear array is useful for interfacing with a photon detector, such as a CCD. The two-dimensional array end of the FAST system may be positioned to receive photons from a sample. The photons from the sample may be, for example, emitted by the sample, reflected off of the sample, refracted by the sample, fluoresce from the sample, or scattered by the sample. The scattered photons may be Raman photons.

In a FAST spectrographic system, photons incident to the two-dimensional end of the FAST system may be focused so that a spectroscopic image of the sample is conveyed onto the two-dimensional array of optical fibers. The two-dimensional array of optical fibers may be drawn into a one-dimensional distal array with, for example, serpentine ordering. The one-dimensional fiber stack may be operatively coupled to an imaging spectrograph of a photon detector, such as a charge-coupled device ("DETECTOR" in FIG. 1A), so as to apply the photons received at the two-dimensional end of the FAST system to the detector rows of the photon detector.

One advantage of this type of apparatus over other spectroscopic apparatus is speed of analysis. A complete spectroscopic imaging data set can be acquired in the amount of time it takes to generate a single spectrum from a given material using other systems. Additionally, the FAST system can be implemented with multiple detectors. The FAST system allows for massively parallel acquisition of full-spectral images. A FAST fiber bundle may feed optical information from its two-dimensional non-linear imaging end (which can be in any non-linear configuration, e.g., circular, square, rectangular, etc.) to its one-dimensional linear distal end input into the photon detector. Given the advantageous ability of a FAST system to acquire hundreds to thousands of full spectral range, spatially-resolved spectra, such as Raman spectra, substantially simultaneously, a FAST system may be used in a variety of situations to help resolve difficult spectrographic problems, such as the presence of polymorphs of a compound, sometimes referred to as spectral unmixing.

Spectroscopy images may generally be acquired using one of two classes of approaches: (1) scanning, and (2) widefield imaging. In scanning methods, a radiation source is focused onto the surface of a sample and a spectrum from each spatial position is collected using a dispersive spectrograph or interferometer. Long data collection times are common with scanning methods because the duration of the experiment is proportional to the number of image pixels. Because of such long data collection times, scanned images are captured at low image definition, which relates directly to the limited utility of the technique as an imaging tool, for the routine assessment of material morphology. Furthermore, the spatial resolution of the image is limited by the size of the source illumination on the sample and the rastering mechanism, which requires the use of moving mechanical parts that are challenging to operate reproducibly. In addition, for light-absorbing materials, scanning methods present an enormous challenge. These materials have low damage thresholds, which require the use of low laser power densities to minimize local thermal expansion and sample degradation.

Despite the limitations, scanning methods are relatively mature techniques and have been applied in a number of applications. An advantage of scanning-based imaging is the ability to capture the entire spectrum in an efficient manner. This advantage is best realized in the research evaluation of new material systems where the underlying spectroscopy is not well understood, and therefore, benefits may be available from the analysis of the entire spectrum.

In widefield imaging, the entire sample field of view is illuminated and analyzed. Numerous widefield imaging approaches have been demonstrated, with the majority of methods involving the recording of an image at discrete spectral intervals though an imaging spectrometer. For example, the imaging spectrometer can include one or more of a conformal filter (CF), a liquid crystal tunable filter (LCTF), an acousto-optical tunable filter (AOTF), or a Fiber Array Spectral Translator (FAST).

Because both (X-Y) spatial dimensions are collected simultaneously in widefield imaging using imaging spectrometers, the imaging duration is proportional to the number of spectral channels and not to the number of image pixels. The advantages of widefield imaging are best realized when high fidelity images at a limited number of wavelengths provide sufficient chemical and spatial information. In most material characterization applications, only a limited number of spectral bands (typically <100) are required to analyze the analytes of interest. By reducing the number of spectral channels, the duration of the widefield experiment decreases without losing spatial resolution. In addition, time-dependent changes in the sample are only observed in the spectral dimension, which simplifies the analysis of images in widefield imaging.

Conversely, attempts to reduce the duration of scanning experiments (in the scanning approach discussed above) compromise either the spatial resolution or the field of view. Reducing the number of spectral channels in scanning mode has little effect on the experiment duration because the entire chemical spectrum is captured simultaneously (in the scanning approach discussed above). Scanning experiments record time-dependent sample changes as spatial variations. Pixels collected at different times often have induced spectral differences that complicate analysis.

One limitation of widefield imaging is secondary scattering of illumination that fundamentally reduces the inherent confocality associated with the measurement(s). Secondary scattering occurs when illumination of a first location results in an emission or scattering of radiation that migrates to a second sample location and is detected as if it had originated from the second spatial location. In contrast, scanning approaches are less susceptible to secondary illumination effects because the illumination is restricted to a first sample location, and the collected light is restricted to the same sample location through use of pinhole apertures. Line scanning approaches are slightly more susceptible to secondary scattering effects along the sample axis. FAST enables full spectral acquisition for hundreds to thousands of spatially resolved spectra in a single image frame, which dramatically increases data acquisition rates as compared to other tunable filter-based technologies. Software is used to extract the spatial and spectral information to reconstruct hyperspectral (chemical imaging) data cubes of the original object. Furthermore, FAST is a rugged technology that operates over an extensive spectral range from ultraviolet (UV) to infrared (IR).

Figure 4:
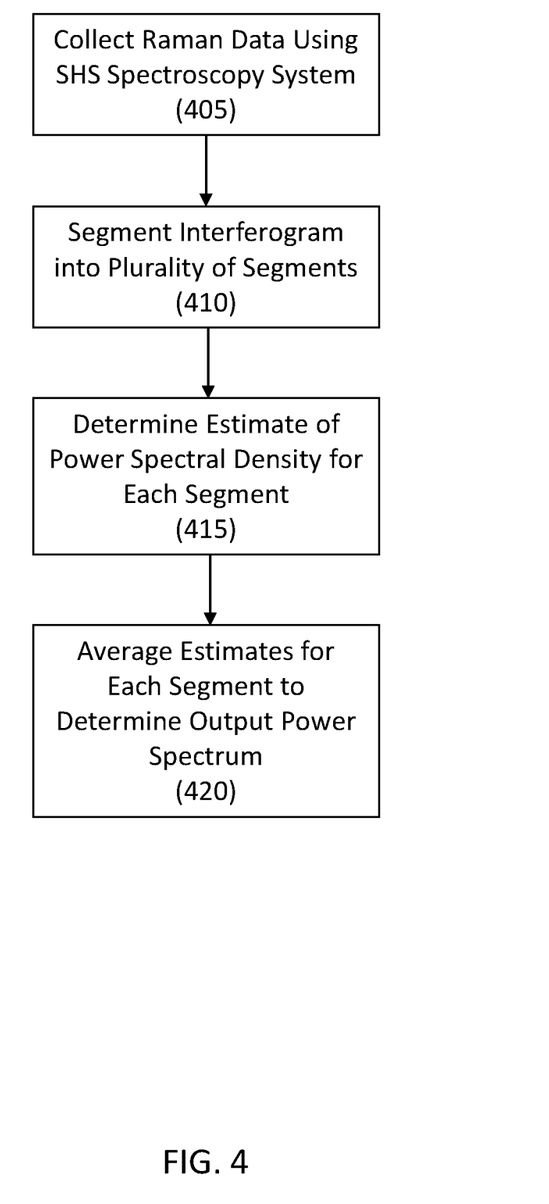
FIG. 4 depicts a flow diagram of an illustrative method of performing a windowing analysis on a sample using a spectroscopy system in accordance with an embodiment.

It has been determined that Welch's Method may be used to improve the signal to noise ratio (SNR) of interferometric sensor data. FIG. 4 depicts a flow diagram of an illustrative method of performing a windowing analysis on a sample using a spectroscopy system in accordance with an embodiment. As shown in FIG. 4, a SHS spectroscopy system may be used to collect 405 Raman data from a sample to form a spatial heterodyne interferogram. In an embodiment, a FAST-SHS spectroscopy system may be used to collect 405 Raman data from the sample. Although the SHS spectroscopy system is performed in certain embodiments on a FAST device, the disclosure is not so limited. The spectral system must be a interferometer based system, such as a Fourier Transform Raman system. While Welch's Method is used in some embodiments to improve the SNR of interferometric sensor data, the disclosure is not so limited. In alternative embodiments, SNR is improved by one of or more of Blackman-Tukey method, Minimum Variance Spectrum Estimator, Multiwindow Spectrum Estimator, and Thomson's multitaper method.

The sensors of the SHS spectroscopy system may be segmented 410 into a plurality of segments. In an embodiment, each segment may have the same length (M), where the length may represent a number of sensors. In an embodiment, the length for a segment may be a portion or all of the sensors in a row, a column, a diagonal or any other grouping of sensors of a sensor array of the SHS spectroscopy system. In an embodiment, the length for a segment may be a portion of the sensors in a linear sensor array, such as is used in a FAST-SHS spectroscopy system. In an embodiment, the length for a segment may be a value between about 25% and about 75% of the number of sensors in a sensor array. In an embodiment, the length for a segment may be a value between about 35% and about 65% of the number of sensors in a sensor array. In an embodiment, the length for a segment may be a value between 50% and about 75% of the number of sensors in a sensor array. In an embodiment, the length for a segment may be about 50% of the number of sensors in a sensor array. In an embodiment, the length for a segment may be about 35% of the number of sensors in a sensor array.

In an embodiment, the initial sensor of consecutive segments may be offset by a number of sensors (M-D). As such, in an embodiment, a segment may overlap with one or more adjacent segments. For example, in an embodiment in which D<M, a first segment may include sensors 0 to M−1, and a second segment may include sensors M−D to D+M−1. In this embodiment, sensors M−D to M−1 are included within both the first and second segments. One of ordinary skill in the art will be aware that 2 or more segments may also include a single sensor depending on the length of the segments and the offset number for each segment.

An estimate of the power spectral density for each segment may be determined 415. In an embodiment, the estimate of the power spectral density may be determined by identifying a modified periodogram for each segment with a window of size j, where j=0, . . . , M−1. A finite Fourier transform may be performed with respect to each windowed segment as part of determining the modified periodograms. The estimates for each segment may be averaged 420 to determine an output power spectrum.

When using a SHS for Raman spectroscopy, the theoretical spectral resolution of the system is determined by the diffraction gratings used. The resolving power is computed according to Equation 1, where Rp is the resolving power, Gd is groove density of the gratings (grooves/mm), and Wg is the physical width of the grating (mm).

$$Rp = 2*Gd*Wg \quad (1)$$

The SHS achieves improved theoretical resolving power over prior art Raman spectrometers. However, this improved resolving power can in some configurations be too high and adversely reduce the spectral bandpass of the overall system. The spectral bandpass of an SHS is determined according to Equation 2, where BP is the spectral bandpass (nm), N is the number of pixels in the x direction of the detector, λ is the wavelength the gratings are set to, and Rp is the resolving power.

$$BP = \frac{N\lambda}{2Rp} \quad (2)$$

In configurations where the improved resolving power reduces the usable spectral bandpass to an undesirable level, the disclosed Welch's Method techniques reduce or eliminate any loss to the spatial resolution and reduce noise by increasing SNR. Thus, incorporation of the techniques disclosed herein such as Welch's Method in SHS applications avoids drawbacks that would otherwise be present.

Furthermore, a wavelength's frequency in the interferogram can be determined by Equation 3, where f is the frequency in fringes/cm, σ is the wavenumber of interest, σL is the Littrow wavenumber, and θL is the Littrow angle.

$$f=4(\sigma-\sigma L)*\tan(\theta L) \quad (3)$$

For SHS technology, the greater the difference between an incoming wavelength and the Littow setting of the SHS, the more frequent and narrow an interference pattern will become. A smaller difference will create a pattern with wider, less frequent fringes.

Figure 5:
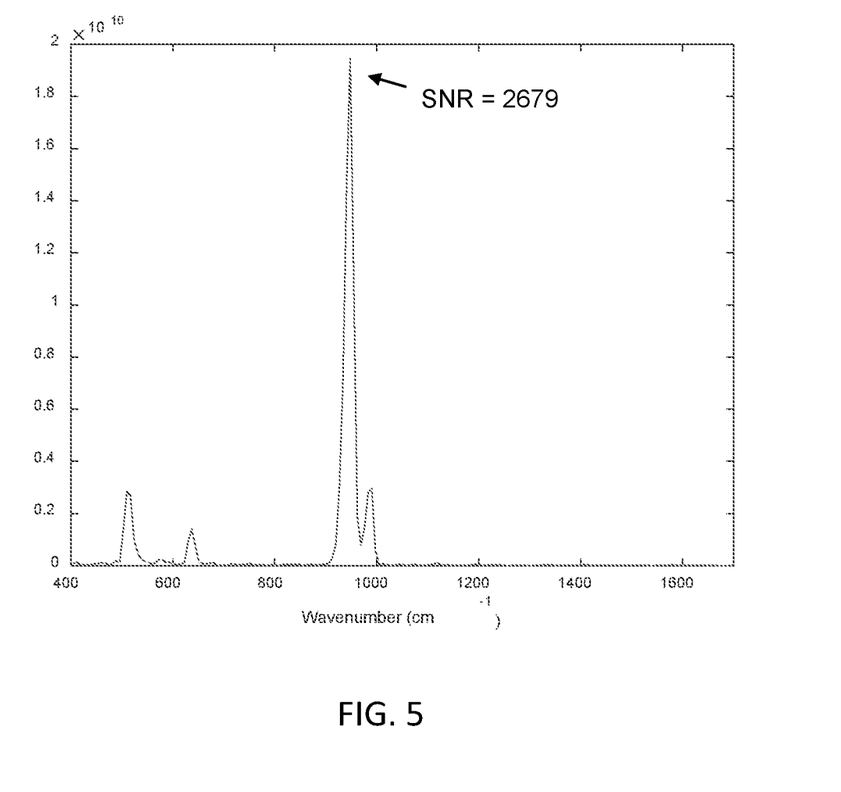
FIG. 5 depicts an illustrative Raman spectrum resulting from the application of a windowing analysis on the same sample using a SHS spectroscopy system in accordance with an embodiment.

One advantage of the above-described method is an improved signal-to-noise ratio over conventional Fourier transform analysis. The above-described method significantly reduces the variance within the interferogram because of the averaging of the windowed segments. This reduction in variance directly leads to an improved signal-to-noise ratio as evidenced in FIG. 5. More particularly, the SNR of the improved system is 2679. As compared with FIG. 3 above, a 19× increase in signal-to noise ratio resulted from the application of the above-described method based on selecting optimized parameters for interferogram window length (M), FFT length (N) and overlap percentage ((M−D)/M).

The window that is selected is not limited and includes one or more of a Hamming window, a Parzen window, a Bartlett window, a Hann window, a rectangular window, a Blackman window, a Blackman-Harris window, a Kaiser-Bessel window, and a Tukey window. When the Hamming window is selected, in one embodiment the window length is 512, the segments are overlapped by 50% of the window length or 256, and a fast Fourier transform length of 512 is used. Selection of the Hamming window with a window length of 512 resulted in the 19× increase in SNR described in the preceding paragraph.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that various features of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various features. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera. As a non-limiting example, each range discussed herein can be readily broken down into a lower third, middle third and upper third, et cetera. As will also be understood by one skilled in the art, all language such as "up to," "at least," and the like include the number recited and refer to ranges that can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

The invention claimed is:

1. A method of performing spectral processing using a spectroscopy system, the method comprising:
    collecting Raman spectral data using a spatial heterodyne spectrometer having a sensor array comprising a plurality of sensors;
    segmenting the sensor array into a plurality of segments, wherein each of the plurality of segments includes one or more of the plurality of sensors;
    for each segment, determining an estimate of power spectrum density; and
    averaging the estimates of power spectrum density for each segment to provide an output spectrum.

2. The method of claim 1, wherein each of the plurality of segments has the same number of sensors.

3. The method of claim 2, wherein each of the plurality of segments has between about 25% and about 75% of the plurality of sensors.

4. The method of claim 2, wherein each of the plurality of segments has about 35% of the plurality of sensors.

5. The method of claim 1, wherein an offset between a first segment and a second segment is less than a number of sensors in the first segment.

6. The method of claim 1, wherein determining an estimate of power spectrum density comprises:
    determining a modified periodogram for each segment; and
    performing a finite Fourier transform for the modified periodogram.

7. The method of claim 6, further comprising:
    applying a window to one or more sensors of the sensor array.

8. The method of claim 7, wherein the window is one or more of a Hamming window, a Parzen window, a Bartlett window, a Hann window, a rectangular window, a Blackman window, a Blackman-Harris window, a Kaiser-Bessel window, and a Tukey window.

* * * * *